US007401263B2

(12) United States Patent
Dubois, Jr. et al.

(10) Patent No.: US 7,401,263 B2
(45) Date of Patent: Jul. 15, 2008

(54) SYSTEM AND METHOD FOR EARLY DETECTION OF SYSTEM COMPONENT FAILURE

(75) Inventors: Andrew J. Dubois, Jr., Howey-in-The-Hills, FL (US); Vaughn Robert Evans, Cary, NC (US); David L. Jensen, Peekskill, NY (US); Ildar Khabibrakhmanov, Syosset, NY (US); Stephen Restivo, Chapel Hill, NC (US); Christopher D. Ross, Cary, NC (US); Emmanuel Yashchin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 11/132,265

(22) Filed: May 19, 2005

(65) Prior Publication Data

US 2006/0265625 A1 Nov. 23, 2006

(51) Int. Cl.
*G06F 11/00* (2006.01)

(52) U.S. Cl. .......................... 714/47; 702/184; 702/187

(58) Field of Classification Search ................... 714/47; 702/179, 181, 184, 187
See application file for complete search history.

(56) References Cited

U.S. PATENT DOCUMENTS

| | | | | |
|---|---|---|---|---|
| 5,253,184 | A | 10/1993 | Kleinschnitz | 364/550 |
| 5,608,845 | A | 3/1997 | Ohtsuka et al. | 395/50 |
| 6,442,508 | B1 | 8/2002 | Liao et al. | 702/186 |
| 6,684,349 | B2 | 1/2004 | Gullo et al. | 714/47 |
| 6,687,634 | B2 | 2/2004 | Borg | 702/85 |
| 6,691,064 | B2 * | 2/2004 | Vroman | 702/183 |
| 6,816,798 | B2 | 11/2004 | Pena-Nieves et al. | 702/84 |
| 6,947,797 | B2 * | 9/2005 | Dean et al. | 700/79 |
| 7,107,491 | B2 * | 9/2006 | Graichen et al. | 714/37 |
| 2001/0032103 | A1 * | 10/2001 | Sinex | 705/4 |
| 2002/0138311 | A1 | 9/2002 | Sinex | 705/4 |
| 2003/0046026 | A1 * | 3/2003 | Levy et al. | 702/181 |
| 2003/0149590 | A1 | 8/2003 | Cardno et al. | 705/1 |
| 2003/0216888 | A1 * | 11/2003 | Ridolfo | 702/181 |
| 2004/0024726 | A1 | 2/2004 | Salem | 707/1 |
| 2004/0123179 | A1 | 6/2004 | Dragomir-Daescu et al. | 714/1 |
| 2004/0167832 | A1 | 8/2004 | Wille | 705/28 |
| 2005/0165582 | A1 * | 7/2005 | Tsung et al. | 702/184 |
| 2006/0259271 | A1 * | 11/2006 | House et al. | 702/181 |

* cited by examiner

*Primary Examiner*—Marc Duncan
(74) *Attorney, Agent, or Firm*—Whitham, Curtis, Christofferson & Cook, PC; Stephen C. Kaufman

(57) ABSTRACT

A system and method for detecting trends in time-managed lifetime data for products shipped in distinct vintages within a time window. Data is consolidated from several sources and represented in a form amenable to detection of trends using a criterion for measuring failure. A weight is applied to the failure measures, the weight increasing over the time the products are in the time window. A function of weighted failures is used to define a severity index for proximity to an unacceptable level of failures, and an alarm signal is triggered at a threshold level that allows the level of false alarms to be pre-set.

12 Claims, 2 Drawing Sheets

| 210 | 220 | 240 | 250 | 260 | 230 | 270 |
|---|---|---|---|---|---|---|
| OBS | DATES | WMONTHS | WREPL | RATES | VOLS | 1 2 3 4 5 6 7 8 9 10 1 2 3 4 5 |
| 1 | 1/2/2002 | 15 | 0 | 0.000 | 1 | 000000000000000 |
| 2 | 1/3/2002 | 13 | 0 | 0.000 | 1 | 0000000000000** |
| 3 | 1/4/2002 | 15 | 0 | 0.000 | 1 | 000000000000000 |
| 4 | 1/18/2002 | 238 | 2 | 0.008 | 16 | 000000000001100 |
| 5 | 1/25/2002 | 13 | 1 | 0.077 | 1 | 0001000000000** |
| 6 | 1/28/2002 | 13 | 0 | 0.000 | 1 | 0000000000000** |
| 7 | 1/29/2002 | 13 | 0 | 0.000 | 1 | 0000000000000** |
| 8 | 1/30/2002 | 13 | 0 | 0.000 | 1 | 0000000000000** |
| 9 | 1/31/2002 | 26 | 0 | 0.000 | 2 | 0000000000000** |
| 10 | 2/1/2002 | 12 | 0 | 0.000 | 1 | 000000000000*** |
| 11 | 2/4/2002 | 26 | 0 | 0.000 | 2 | 0000000000000** |
| 12 | 2/6/2002 | 78 | 5 | 0.064 | 6 | 0000000010400** |
| 13 | 2/7/2002 | 13 | 0 | 0.000 | 1 | 0000000000000** |
| 14 | 2/11/2002 | 13 | 2 | 0.154 | 1 | 0000000200000** |
| 15 | 2/12/2002 | 13 | 0 | 0.000 | 1 | 0000000000000** |
| 16 | 2/15/2002 | 13 | 1 | 0.077 | 1 | 0000000000010** |
| 17 | 2/18/2002 | 26 | 0 | 0.000 | 2 | 0000000000000** |
| 18 | 2/19/2002 | 65 | 0 | 0.000 | 5 | 0000000000000** |
| 19 | 2/21/2002 | 13 | 0 | 0.000 | 1 | 0000000000000** |
| 20 | 2/22/2002 | 13 | 0 | 0.000 | 1 | 0000000000000** |
| 21 | 2/23/2002 | 104 | 0 | 0.000 | 8 | 0000000000000** |
| 22 | 2/25/2002 | 26 | 0 | 0.000 | 2 | 0000000000000** |
| 23 | 2/26/2002 | 13 | 0 | 0.000 | 1 | 0000000000000** |
| 24 | 2/27/2002 | 13 | 0 | 0.000 | 1 | 0000000000000** |

*Figure 2*

SYSTEM AND METHOD FOR EARLY DETECTION OF SYSTEM COMPONENT FAILURE

BACKGROUND OF THE INVENTION

1. Field of the Invention

The present invention generally relates to early detection of system component failure, and in particular to monitoring tools for that purpose using statistical analysis of time-managed lifetime data streams of component monitoring information.

2. Background Description

In large scale manufacturing, it is typical to monitor warranty performance of products shipped. Products are shipped on a certain date and, over time, various components may fail, requiring warranty service. A certain level of component failure is to be expected—indeed, that is what the warranty provides for. But there may also be components which have performance problems that result in higher than expected failure rates, and which require upstream remedies such as removal from the distribution chain. Early notification of the need for such upstream remedies is highly desirable.

A number of patents and published applications deal with tracking lifetime (especially failure and reliability) data. U.S. Pat. No. 5,253,184 "Failure and performance tracking system" to D. Kleinschnitz discusses tracking of a single electronic system that has an internal processing ability to diagnose failures and record information about them.

U.S. Pat. No. 5,608,845 "Method for diagnosing a remaining lifetime, apparatus for diagnosing a remaining lifetime, method for displaying remaining lifetime data, display apparatus and expert system" to H. Ohtsuka and M. Utamura discusses an expert system for determining a remaining lifetime of a multi-component aggregate when information about degradation of individual components is available.

U.S. Pat. No. 6,442,508 "Method for internal mechanical component configuration detection" to R. L. Liao, S. P. O'Neal and D. W. Broder describes a method for automatic detection by a system board of a mechanical component covered by warranty and communication of such information.

U.S. Patent Publication No. 2002/0138311 A1 "Dynamic management of part reliability data" to B. Sinex describes a system for dynamically managing maintenance of a member of a fleet (e.g. aircraft) by using warranty-based reliability data.

U.S. Patent Publication No. 2003/0149590 A1 "Warranty data visualization system and method" to A. Cardno and D. Bourke describes a system for visualizing weak points of a given product (e.g. a chair) based on a database representing interaction between customers and merchants.

U.S. Pat. No. 6,684,349 "Reliability assessment and prediction system and method for implementing the same" to L. Gullo, L. Musil and B. Johnson describes a reliability assessment program (RAP) that enables one to assess reliability of new equipment based on similarities and differences between it and the predecessor equipment.

U.S. Pat. No. 6,687,634 "Quality monitoring and maintenance for products employing end user serviceable components" to M. Borg describes a method for monitoring the quality and performance of a product (e.g. laser printer) that enables one to detect that sub-standard third party replacement components are being employed.

U.S. Patent Publication No. 2004/0024726 A1 "First failure data capture" to H. Salem describes a system for capturing data related to failure incidents, and determining which incidents require further processing.

U.S. Patent Publication No. 2004/0123179 A1 "Method, system and computer product for reliability estimation of repairable systems" to D. Dragomir-Daescu, C. Graichen, M. Prabhakaran and C. Daniel describes a method for reliability estimation of a repairable system based on the data pertaining to reliability of its components.

U.S. Patent Publication No. 2004/0167832 A1 "Method and data processing system for managing products and product parts, associated computer product, and computer readable medium" to V. Willie describes a system for managing the process of repairs and recording information about repairs in a database.

U.S. Pat. No. 6,816,798 "Network-based method and system for analyzing and displaying reliability data" to J. Pena-Nieves, T. Hill and A. Arvidson describes a system for displaying reliability data by using Weibull distribution fitting to ensure reliability has not changed due to process variation.

None of the systems described above are able to handle the problem of monitoring massive amounts of time-managed lifetime data, while maintaining a pre-specified low rate of false alarms. What is needed is a method and system capable of such monitoring.

SUMMARY OF THE INVENTION

It is therefore an object of the present invention to provide a monitoring tool for detecting, as early as possible, that a particular component or sub-assembly is causing an unusually high level of replacement actions in the field.

Another objective is to ensure that an alarm produced by the monitoring system can be quickly and reliably diagnosed, so as to establish the type of the condition (e.g., infant mortality, wearout, bad lots) that caused the alarm.

Early detection of such a condition of failure or imminent failure is important in preventing large numbers of machines containing this sub-assembly from escaping into the field. This invention introduces a tool of this type. The invention focuses on situations involving simultaneous monitoring of collections of time-managed lifetime data streams with the purpose of detecting trends (mostly unfavorable) as early as possible, while maintaining the overall rate of false alarms (i.e. where the detected trend turns out to be within expected parameters) at an acceptably low level.

As an example, consider the problem of warranty data monitoring in a large enterprise, say a computer manufacturing company. In this application one is collecting information related to field replacement actions for various machines and components. The core idea is to use a combination of statistical tests of a special type to automatically assess the condition of every table in the collection, assign to the table a severity index, and use this index in order to decide whether the condition corresponding to the table is to be flagged. Furthermore, these analyses can be performed within the framework of a special type of an automated system that is easy to administer.

The invention provides for detecting trends in time-managed lifetime data. It stores in a database time-managed lifetime data for a product. The database can be derived from multiple sources. A criterion is established from the stored data for measuring failure of the product or a component of the product. Then, measured failures of the product or component within a time window is compared against expected failures within the time window. The comparison can be a simulation analysis determining a probability that a hypothetical sequence of vintages having the expected failures will produce a failure statistic less than or equal to the failure statistic for the observed failures, where the probability is an index of severity for the criterion. Finally, an alarm signal is triggered when a value of the comparison exceeds a threshold, the threshold being chosen to limit false alarms to a pre-specified rate.

In a common implementation of the invention, the product is comprised of components and is shipped in a sequence of discrete vintages within the time window, with the time-managed lifetime data for each vintage being updated periodically with new information as each said vintage progresses through the time window.

In one implementation of the invention the failure statistic is produced by establishing a weight to be applied to a value of the criterion, the weight being proportional to a volume of the product within a vintage and increasing over time within the time window. For example, the weight can be a measure of service time of the product within a vintage, such as the number of machine months of service within a vintage. Then there is defined for each vintage in the sequence a cumulative function based on the weight applied to a value of the criterion, with the value of the criterion being reduced by a reference value before application of the weight. Then there is defined a maximum value of the cumulative function over the vintages. Further, the threshold is a trigger value, slightly less than one, of the severity index, and the probability of a false alarm is the difference between one and the threshold.

Further implementations of the invention address triggers adapted to products or components which have more recent activity. For example, a supplemental alarm signal can be based on a failure statistic limited to the cumulative function that includes the most recent vintage, producing a corresponding severity index. A tertiary alarm signal can be triggered for active products or components when the comparison determines a probability that a hypothetical sequence of vintages having the expected failures will produce within an active period a cumulative total of expected failures greater than or equal to the cumulative total of the observed failures. Furthermore, a composite alarm signal can be generated from a functional combination of severity indices associated with the three above described alarm signals.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a an example of a table whose rows contain a description of a lifetime-type test of machines grouped by shipping date.

DETAILED DESCRIPTION OF A PREFERRED EMBODIMENT OF THE INVENTION

Figure 1:
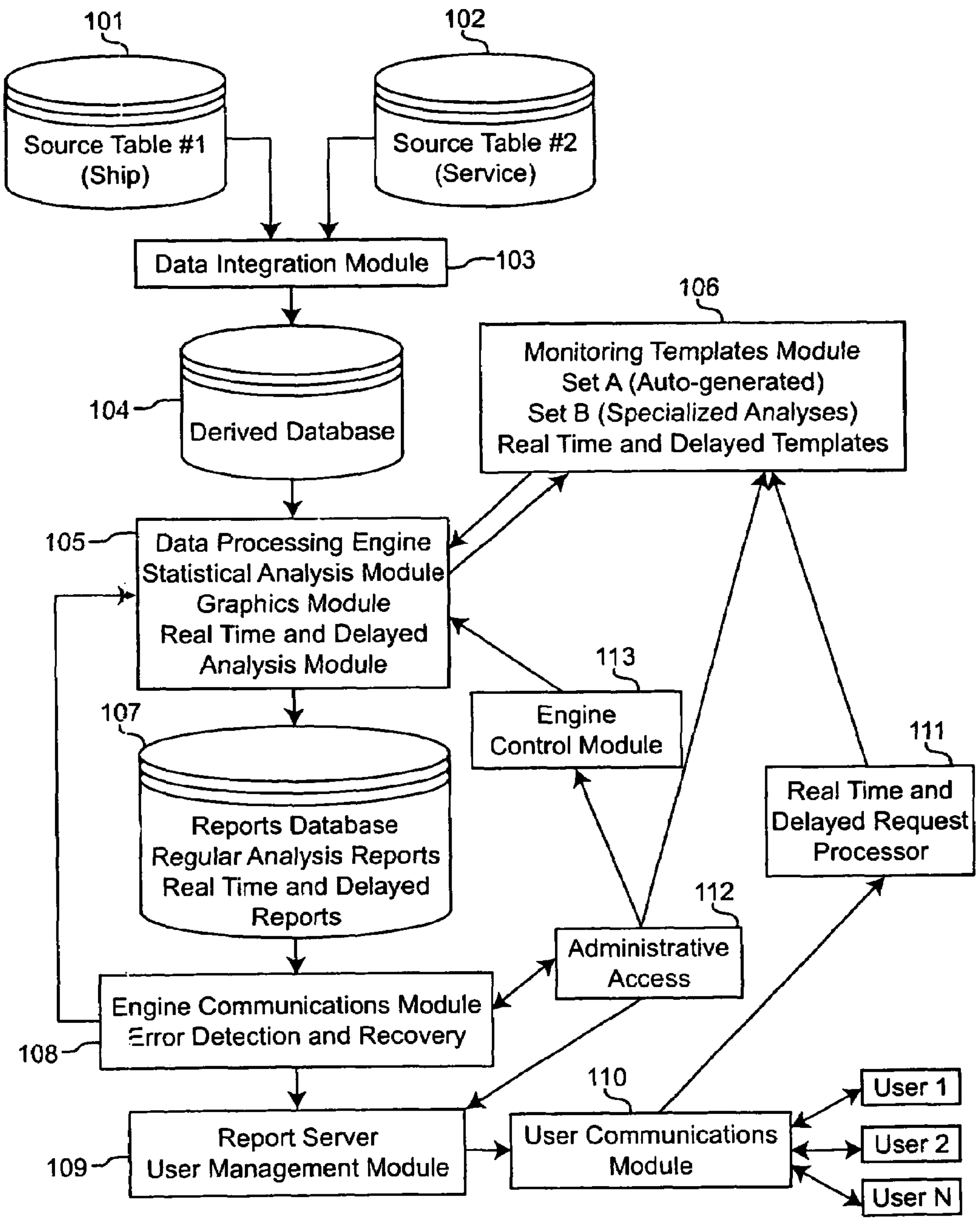
FIG. 1 is a schematic showing the components and operation of the invention.

Let us assume that the enterprise is producing and distributing systems that consist of various components or sub-assemblies. In the customer environment, the systems are experiencing failures that lead to replacement of components. The process of replacements has certain expected patterns, and the tool described below leads to triggering signal conditions (flagging) associated with violation of these patterns.

Turning to FIG. 1, the data integration module 103 of the tool is responsible for integrating various data sources so as to produce a complete table (or database) 104 that contains relevant information about every component or sub-assembly shipped as part of a system. For example, let us suppose that there are two sources of data, which we will identify as Ship 101 and Service 102 sources. The Ship database contains information on components shipped with each system and the Service database contains information about failures of the systems in the field. The data integration module could then produce a complete table containing records of the type

| | |
|---|---|
| Brand: | Mobile |
| Component: | Hard Drive |
| Geography: | US |
| Machine Type: | 5566 |
| Fru: | 12P3456 |
| Part Number: | 74N4321 |
| Machine Serial Number: | 1234567 |
| Customer ID: | ABCDEF |
| Component Vintage: | 2004-01-12 |
| Machine Ship Date: | 2004-01-24 |
| Service Date: | 2004-08-31 |
| Service Type: | 1 |
| Quantity Replaced: | 12 |

The data integration module 103 is also capable of producing specialized time-managed tables for survival analysis, based on the above complete table. For example, it could produce a "component ship" table where rows correspond to successive component vintages, and the columns contain lifetime information specific to these vintages. A typical row would look like:

2004-01-12 1000 1000 0 1000 1 999 0 . . .

indicating that on 2004-01-12 the component manufacturer produced 1000 components (hard drives) that got installed in the systems at their own pace. Of these, 1000 entered into first month of service and suffered no failures (the pair 1000 0), and 1000 entered into the 2-nd month of service and suffered 1 failure (the 2-nd pair 1000 1), 999 entered into 3-rd month of service, and suffered no failures in this month (999 0), and so forth.

Similarly, the data integration module 103 could be used to produce time-managed tables corresponding to sorting by machine ship dates, sorting by calendar dates, and so forth. In summary, the data integration module 103 generates tables that are used to detect a set of targeted conditions: for example, "component ship" table is suitable for detection of abrupt changes, sequences of off-spec lots, or quality problems initially present at the level of component manufacturing. A similar table with rows corresponding to "machine ship" dates is suitable for detection of problems at the system assembly level. A similar table with rows corresponding to calendar time is suitable for detection of trends related to seasonality or upgrade cycles, and so forth.

The monitoring templates module 106 is responsible for maintaining parameters which govern the process of monitoring. The templates are organized in a database, and a parameter (for example, failure rate corresponding to drives of type 12P3456 in a system of type 5566) corresponds to an entry in this database. Templates are organized in classes, where a class is usually associated with a basic or derived data file. For example, a class of templates could be responsible for detection of trends for systems of brand "Mobile" with respect to components of type "Hard Drive", for derived data tables in "ship vintage" format.

The entry of a template contains such characteristics as analysis identifier type of analysis acceptable level of process failures
unacceptable level of process failures
target curve for the process failures, by age
acceptable probability of a false alarm
data selection criteria The monitoring templates module 106 is also responsible for maintaining a set of default parameters that are applied whenever a new component appears in the database. The data sources will usually contain only lifetime information corresponding to a most recent segment of time; for example, a warranty database is likely to contain only records corresponding to the last 4 years. Therefore, in the process of monitoring one will regularly run into situations involving time-managed tables, where older components "disappear" from view, and the new components appear. The default analysis sub-module maintains a set of rules by which the new components are handled until templates for them are completed in the monitoring templates database (not shown) by the tool Administrator 112 (should he choose to do so).

The monitoring templates module 106 maintains two sets of templates: set A that is updated by the Data Processing Engine 105 automatically in the course of a regular run, and set B that contains specialized analyses maintained by the Administrator 112. Set A consists of all analyses that are automatically rendered as "desirable" through a built-in template construction mechanism. For example, this mechanism could require that an analysis be performed for every Machine Type—Component combination that is presently active in the data sources, using processing parameters obtained from the default analysis sub-module. The Administrator 112 can modify entries in set A; the inheritance property of set A will ensure that these changes remain intact in subsequent analyses—they will always override parameters generated automatically in the course of the regular run of the data processing engine 105.

A section of the monitoring templates module 106 is dedicated to templates related to real time and delayed user requests and deposited via the Real Time and Delayed Requests Processor 111. This section is in communication with the Real Time and Delayed Analysis Module of the Data Processing Engine 105. The latter is responsible for processing such requests in accordance with an administrative policy set via the engine control module 113.

The processing engine control module 113 is responsible for maintaining access to the data processing engine 105 that analyzes data produced by the data integration module 103 based on the templates generated/maintained by the monitoring templates module 106. Monitoring templates module 106 is also responsible for creation/updating of the set A of monitoring templates based on the integrated data. The data processing engine 105 is activated in regular time intervals, on a pre-specified schedule, or in response to special events like availability of a new batch of data or real-time user requests. The processing engine 105 is responsible for successful completion of the processing and for transferring the results of an analysis in the reports database 107. A set of submodules are specified in this module, specifically those affecting status reports, error recovery, garbage collection, and automated backups. The processing engine 105 maintains an internal log that enables easy failure diagnostics.

The data processing engine 105 can also be activated in response to a user-triggered request for analysis. In this case the user's request is collected and processed by the real time requests module 111 and are delivered to the monitoring templates module 106 and submitted to the engine 105 for processing. The results of such analyses go into separate "on-demand" temporary repositories; the communication module 108 is responsible for their delivery to the report server module 109 that, in turn, delivers the results, via the user communications module 110, to the end user's computer, where they are projected onto the user's screen through an interface module (not shown). The report server module 109 is also typically responsible for security and access control.

Results of the analysis performed by the processing engine 105 are directed to the reports database 107 which contains repositories of tables, charts, and logbooks. A separate section of this database is dedicated to results produced in response to requests of real-time users. The records in the analysis logbooks match the records in processing templates and, in essence, complement the latter by associating with them the actual results of analyses requested in the monitoring templates module 106. The system logbook records information on processing of pre-specified classes of templates by the engine 105, e.g. information on processing times/dates, description of errors or operation of automated data-cleaning procedures.

The engine communications module 108 is responsible for communications between the reports database 107 and the report server 109. It is also responsible for notifying the Administrator 112 about errors detected in the course of operation of the engine 105 and transmission of reports by the engine 105. It is activated automatically upon completion of data processing by the engine 105.

The reports server 109 is responsible for maintaining communications with the reports database 107 (via communications module 108) on one hand, and with end-user interfaces on the other hand. The latter connection is governed by the user communication module 110. The reports server 109 is also responsible for security, access control and user profile management through a user management module.

The statistical analysis module and graphics module in the data processing engine 105 are responsible for performing a statistical analysis of data based on the monitoring templates generated in the monitoring templates module 106. The data being analyzed is a time-managed lifetime data stream, which is a special type of stochastic process indexed by rows of a data table. Every row contains a description of a lifetime-type test: it specifies the number of items put on test and such quantities as test duration, the fraction of failed items or number of failures observed on various stages of the test; it could also give the actual times of failures. As time progresses, all rows of the table are updated; in addition, new rows are added to the table and rows deemed obsolete are dropped from the table in accordance with some pre-specified algorithm.

An example report structure for early detection of trends in collections of time-managed lifetime data streams is shown in FIG. 2. The table shows a number of data observations 210, each indicating a date 220 when a certain number (VOLS) 230 of machines were shipped. The other columns are updated each time the table is compiled. One column show the accumulated machine months of service (WMONTHS) 240 for the machines being tracked by a row of data, another shows the number of those machines where there was a failure requiring replacement (WREPL) 250, and a further column (RATES) 260 shows the failure rate (i.e. failures per machine month of service) for the machines included in the observation (i.e. a row of the table). There is an additional column for each month of service 270 since those machines began in service, showing the number of failures during that month.

Each row provides a history of machines shipped on respective dates, as of the date the table is compiled. For the table in FIG. 2, assume the table was compiled in May 2003.

By way of example, row #4 (in column OBS 210) specifies that 16 machines (in column VOLS 230) were shipped on Jan. 18,2002 (in column DATES 220). As of May 2003, these machines collectively accumulated 238 machine-months of service (in column WMONTHS 240) and suffered 2 replacements (in column WREPL 250), resulting in a failure rate of 0.008 (in column RATES 260). The two failures occurred when the machines were in their $12^{th}$ and $13^{th}$ months of service, respectively (in the months-of-service columns 270). Note that the data in the months-of-service columns 270 are relative to the time the machines were placed in service, which may not be the same as the date of shipment. For example, note the two asterisks ("*") at the end of the row for observation #2 in the columns for the $14^{th}$ and $15^{th}$ months of service. This indicates that these machines were placed in service not in January 2002, when they were shipped, but two months later in March 2002.

Note that every row of the table can change upon the next compilation, either because of change in columnar data being tracked (e.g. cumulative machine months 240 or cumulative replacements 250) or because older rows are being dropped from the table or new rows are being added. For example, if the table is compiled monthly, the next compilation will be in June 2003. At this time the first several rows of the table may be removed as obsolete, e.g. if the early machines are no longer in warranty. Or additional rows may be appended to the bottom of the table if information about new vintages becomes available.

Returning now to FIG. 1, and in particular to the statistical analysis module within the data processing engine 105, the technique of the invention is to apply a set of criteria for a flagging signal in such a fashion as to limit false alarms to a pre-specified rate, and also to account specially for active components. The set of criteria applied by the invention are as follow:

1. Criterion for Establishing Whether a Condition Requiring a Signal has Occurred at Any Time Since the Data on a Particular Component First Became Available.

This criterion would enable one to trigger a signal based on trends pertaining to, say, 2 years ago at the present point in time. This is important because systems shipped 2 years ago may still be under warranty. The criterion is based on a so-called weighted "cusum" analysis with several important modifications related to the following fact: the data points change every time new information comes in, and so the signal threshold has also to be re-computed dynamically. A special simulation analysis enables (a) establishment of a relevant threshold, (b) deciding whether a signal should be triggered based on the current data for the given template and (c) deciding how severe the condition is, based on the severity index.

The conventional "weighted cusum chart" (e.g. see D. Hawkins and D. Olwell "Cumulative sum charts and charting for quality improvement", Springer, 1998) is only used in situations where the counts are observed sequentially, thus enabling a fixed threshold for $S_i$; as soon as $S_i$ reaches threshold, a signal is triggered. In conventional weighed chart analysis only the last data point is new—all other data remain unchanged. In contrast, in our application the whole table changes every time new data comes in, which makes the conventional application of the "weighted cusum chart" impossible. The present invention re-computes the chart from scratch every time a new piece of data comes in, and therefore requires a dynamically adjusted threshold that is based on a severity index (which in turn is computed by simulation at every point in time). Furthermore, in the type of application addressed by the present invention we also need the supplemental signal criteria based on the concept of "active window" as described below.

In particular, if, for example, the rates of replaced items in successive vintages within the time-managed window comprising N vintages are $X_1, X_2, \ldots, X_N$, and the corresponding weights (that can represent, for example, the number of machine-months for individual vintages) are $W_1, w_2 \ldots, W_N$, then we define the process $S_1, S_2, \ldots S_N$ as follows:

$$S_0=0,\ S_i=\max[0,\ S_{i-1}+W_i(X_i-k)],$$

where k is the reference value that is usually located about midway between acceptable and unacceptable process levels ($l_0$ and $l_1$, respectively), for the process $X_1, X_2, \ldots X_N$ (representing in this case the replacement rates). In the representation above, the value $S_i$ can be interpreted as evidence against the hypothesis that the process is at the acceptable level, in favor of the hypothesis that the process is at the unacceptable level. Now define the max-evidence via $$S=\max[S_1, S_2, \ldots, S_N]$$

as the test quantity that determines the severity of the evidence that the level of the underlying process $X_1, X_2, \ldots, X_N$ is unacceptable. We next determine, based on the fixed weights $W_1, W_2, \ldots, W_N$ the probability that a theoretical process that generates the sequence $X_1, X_2, \ldots, X_N$ under the assumption that this sequence comes from an acceptable process level $l_0$ will produce the max-evidence that is less than or equal to the observed value of S. This probability is defined as the severity index associated with the criterion 1. This probability can be evaluated by simulation.

A flagging signal based on criterion 1 can be triggered when the severity index exceeds some threshold value that is close to 1. The severity index is defined as a probability, and, therefore, must be between 0 and 1. The highest severity is 1 and its meaning is as follows: the observed value of evidence S in favor of the hypothesis that the process is bad is so high, that the probability of not reaching this level S for a theoretically good process is 1. Normally, we could choose 0.99 as the "threshold severity", and trigger a signal if the observed value S is so high that the associated severity index exceeds 0.99. For example, if this threshold value is chosen to be 0.99, we can declare that our signal criterion has the following property: if the underlying process level is acceptable (i.e., $l_0$) then the probability that the analysis will produce a false alarm (i.e. false threshold violation) is 1-0.99=0.01. Thus, thresholding on the severity index enables one to maintain a pre-specified rate of false alarms.

2. Criterion for Establishing Whether Data Corresponding to a Template Should be Considered "Active".

The active period is generally a much more narrow time window than the window in which we run the primary signal criterion. The active period is the most recent subset of this window, going back not more than 60 days. For example, a particular component 12P3456 could be considered active with respect to machine type 5566 if there were components of this type manufactured within the last 60 days. The "active" criterion is applied as a filter against the database. Note that some tables will not have an active period. For example if the table shown in FIG. 2 was compiled on Jun. 1, 2003, then this table does not have an active period, since the last machines shown on this table were shipped on Feb. 27, 2002, i.e. more than 60 days ago.

3. Special Signal Criteria for Active Components.

Supplemental signal criteria are introduced for active components based on (a) current level of accumulated evidence against the on-target assumption based on the dynamic cusum display, and (b) overall count of failures observed for the commodity of interest within the active period. The supplemental criteria are important because for active components one is typically most interested in the very recent trends.

In particular, in accordance with (a) above, for active components we also compute the severity index with respect to the last point $S_N$ of the trajectory (shown by the time-managed data) as the probability that a theoretical process that generates the sequence $X_1, X_2, \ldots, X_N$ under the assumption that this sequence comes from an acceptable process level $l_0$ will produce the last point of a trajectory, computed in accordance with time managed tables produced by data integration module 103, that is less than or equal to the observed value of $S_N$.

Similarly, in accordance with (b) above, for active components we also compute the severity index with respect to the number of unfavorable events (failures) observed within the active period. Suppose that the observed number of such events is C. Then the mentioned severity index is defined as the probability that a theoretical process that generates the sequence $X_1, X_2, \ldots, X_N$ under the assumption that this sequence comes from an acceptable process level $l_0$ will produce the number of unfavorable events that is less than or equal to the observed value C.

The output of the statistics module is i) a time series that characterizes development of evidence against the assumption that the level of failures throughout the period of interest has been acceptable, and ii) severity indices associated with decision criteria mentioned above. For practical purposes, one could choose the condition of a "worst" severity as a basis for flagging the analysis.

It should be noted that three decision criteria, with severity indices and alarm thresholds, have been described. It should be understood that the severities corresponding to these different decision criteria may be combined into a function, and an alarm may be triggered when this function exceeds a threshold. In other words, an alarm can be triggered not because severity for any specific criteria reaches a threshold, but rather because some function of all three severities reaches a threshold.

These quantities output from the statistical module are summarized in the report table that is placed in the repository. Among other things, this table enables one to perform a "time-to-fail" analysis, so as to establish the nature of a condition responsible for an alarm. These quantities are also fed to the graphics module that is responsible for producing a graphical display that enables the user to interpret the results of the analysis, identify regimes, points of change, and assess the current state of the process.

In summary, the invention is a tool for detection of trends in lifetime data that enables one to consolidate data from several sources (using the data integration module) and represent it in the form amenable for detection of trends under the rules maintained by the monitoring templates module. The engine control module governs access to the processing engine so as to assure that the latter operates smoothly, both for scheduled and "on data event" processing, as well as for user-initiated requests for real time or delayed analysis. The tool emphasizes simplicity of administration; this is very important, given that the tool could be expected to handle a very large number of analyses. The specialized algorithms provided by the statistical analysis and graphics modules enable analysis of massive data streams that provide strong detection capabilities based on criteria developed for lifetime data, a low rate of false alarms, and a meaningful graphical analysis. The engine communication module ensures data flows between the processing engine and reports server module, that in turn, maintains secure communications with end users via user maintenance module and interface module.

While the invention has been described in terms of preferred embodiments, those skilled in the art will recognize that the invention can be practiced with modification within the spirit and scope of the appended claims.

The invention claimed is:

1. A method for detecting trends in time-managed lifetime data, comprising the steps of:

storing in a database time-managed lifetime data for a product;

establishing a criterion from said data for measuring failure of said product;

comparing measured failures of the product within a time window against expected failures of the product within said time window; and triggering an alarm signal when a value of said comparison exceeds a threshold, said threshold being chosen to limit false alarms to a pre-specified rate, wherein said product is comprised of components and is shipped in a sequence of discrete vintages within said time window, said time-managed lifetime data for each said vintage being updated periodically with new information as each said vintage progresses through said time window.

2. A method as in claim 1, wherein said comparison is a computation or simulation analysis determining a probability that a hypothetical sequence of vintages having said expected failures will produce a failure statistic less than or equal to said failure statistic for said observed failures, said probability being an index of severity for said criterion.

3. A method as in claim 2, wherein said failure statistic is produced by establishing a weight to be applied to a value of said criterion, said weight being proportional to a volume of said product within a vintage and increasing over time within said time window;

defining and computing for each said vintage in said sequence a cumulative function based on said weight applied to a value of said criterion, said value of said criterion being reduced by a reference value before application of said weight; and defining a maximum value of said function over said vintages.

4. A method as in claim 3, wherein said function is the function $$s_0=0,\ s_i=\max[0,\ s_{i-1}+w_i(x_i-k)],$$

for vintages i=1 to N, where $x_1$ is the value of said criterion for vintage i, $w_i$ is said weight to be applied to said criterion, and k is said reference value.

5. A method as in claim 4, wherein said criterion is a rate of replacement of said product and said weight is a measure of service time of said product within a vintage.

6. A method as in claim 4, further comprising the steps of:

determining whether the product is active;

if the product is active, triggering a supplemental alarm signal when said failure statistic is defined as the value $S_N$.

7. A method as in claim 6, further comprising the step of triggering a tertiary alarm signal, if the product is active, when said comparison is a computation or simulation analysis determining a probability that a hypothetical sequence of vintages having said expected failures will produce within an active period a cumulative total of said expected failures greater than or equal to the cumulative total of said observed failures.

8. A method as in claim 7, further comprising the steps of:

combining said severity index for said criterion with a severity index corresponding to said secondary alarm signal and a severity index corresponding to said tertiary alarm signal into a function; and triggering an alarm signal when said combined function exceeds a threshold.

9. A method as in claim 3, wherein said threshold is a trigger value, slightly less than one, of said severity index, the probability of a false alarm being the difference between one and said threshold.

10. A method as in claim 1, wherein the database is derived from multiple sources.

11. A method as in claim 1, wherein said criterion for measuring failure of said product measures failure of a component of said product.

12. A method for detecting trends in time-managed lifetime data, comprising the steps of:

storing in a database time-managed lifetime data for a product;

establishing a criterion from said data for measuring failure of said product;

comparing measured failures of the product within a time window against expected failures of the product within said time window;

triggering an alarm signal when a value of said comparison exceeds a threshold, said threshold being chosen to limit false alarms to a pre-specified rate, and determining whether the product is active;

if the product is active, triggering a tertiary alarm signal when said comparison is a computation or simulation analysis determining a probability that a hypothetical sequence of vintages having said expected failures will produce within an active period a cumulative total of said expected failures greater than or equal to the cumulative total of said observed failures.

* * * * *